Patented Sept. 18, 1945

2,385,185

UNITED STATES PATENT OFFICE 2,385,185

PROCESS FOR THE MANUFACTURE OF VAT DYES FROM BIS-(9:9'-ANTHRONYLIDENE)-ETHANE

John Woolley Batty and David Alexander Whyte Fairweather, Blackley, Manchester, England, assignors to Imperial Chemical Industries Limited, a corporation of Great Britain No Drawing. Application July 18, 1942, Serial No. 451,504. In Great Britain August 1, 1941

3 Claims. (Cl. 260—351)

This invention relates to the manufacture of vat dyes from $\alpha\beta$-bis-(9:9'-anthronylidene)-ethane and its halogen derivatives.

According to British Patent No. 299,972 a claret-red dye is obtained by the alkali fusion of the first mentioned compound. According to British Patent No. 369,765 this claret-red dye is converted to a reddish-brown vat dye by treating with an acid condensing agent such as aluminium chloride or concentrated sulphuric acid; also the same reddish-brown dye is obtained directly from $\alpha\beta$-bis-(9:9'-anthronylidene)-ethane by treating it with an acid condensing agent such as aluminium chloride, the reaction being advantageously carried out in the presence of an indifferent diluent and with the addition of a suitable oxidising agent such as manganese dioxide, ferric chloride, halogen, air or the like. Also in the above mentioned processes there may be used in addition to $\alpha\beta$-bis-(9:9'-anthronylidene)-ethane, the corresponding derivatives containing halogen which are obtained from halogen derivatives of anthrone. Also according to Berichte d. deut. chem. Ges., 1939, 72, 2134-6, the dye is obtained more conveniently than by the foregoing processes by heating $\alpha\beta$-bis-(9:9'-anthronylidene)-ethane with benzoyl chloride and a trace of iodine in nitrobenzene. The paper states that instead of benzoyl chloride, other acid chlorides can be used, for example acetyl chloride, chloroacetyl chloride and phthalyl chloride, and that the nitrobenzene may be replaced by a high-boiling acid chloride.

We have now found that by treating $\alpha\beta$-bis-(9:9'-anthronylidene)-ethane or its halogen derivatives with an organic acid halide or anhydride and a substance which is either an acid or is capable of acting as such under the conditions of the reaction, preferably in the presence of nitrobenzene or other suitable oxidising agent, vat dyes are obtained of very good purity and in higher yield than by the above processes.

According to the invention we provide a process for the manufacture of vat dyes which comprises treating $\alpha\beta$-bis-(9:9'-anthronylidene)-ethane or its halogen derivatives with an organic acid halide or anhydride as further defined below and a substance which is either an acid or is capable of acting as such under the conditions of the reaction, preferably in the presence of a nitroaromatic hydrocarbon. By organic acid halides and anhydrides we mean chlorides and bromides of organic carboxylic acids and organic sulphonic acids and anhydrides of organic carboxylic acids which are not inner anhydrides. Thus there may be used successfully, for example, acetic anhydride, acetyl chloride, benzoyl chloride and benzoic anhydride.

As suitable nitroaromatic hydrocarbons there may be mentioned nitrobenzene and o-, m- and p-nitroluenes. Substances which are acids or are capable of acting as such under the conditions of the reaction which may be used are, for example, sulphuric acid, oleum, chlorosulphonic acid, methyl chlorosulphonate, pyrosulphuryl chloride, sulphamic acid, sulphoacetic acid, ethane sulphonic acid, m-nitrobenzene sulphonic acid, stannic chloride, antimony penta-chloride, ferric chloride and zinc chloride.

In carrying the invention into practical effect with $\alpha\beta$-bis-(9:9'-anthronylidene)-ethane itself the process proceeds admirably with acetic anhydride, sulphuric acid and nitrobenzene, and it is not necessary to use anything but these cheap and readily available materials in order to obtain very good results.

The following examples in which parts are by weight illustrate but do not limit the invention:

Example 1

To a mixture of 360 parts of nitrobenbene and 32 parts of 98% sulphuric acid, there are added 96 parts of acetic anhydride at 10–15° C. followed by 40 parts of $\alpha\beta$-bis-(9:9'-anthronylidene)-ethane. The temperature is raised to 120° C. in 75 minutes. At about 60° C. the mixture thickens owing to dye crystallising out. The temperature is kept at 120° C. for 1 hour, then allowed to fall to 20° C. The dye is filtered off, washed with nitrobenzene and alcohol and dried. The dye is obtained in very good yield and purity.

Example 2

To a mixture of 27 parts of nitrobenzene and 3 parts of sulphamic acid there are added 8.4 parts of benzoyl chloride and then 3 parts of $\alpha\beta$-bis-(9:9'-anthronylidene)-ethane. The temperature is raised slowly to 170° C. and is so maintained during 1 hour. The mixture is then cooled to 20° C., and the dyestuff, which thereupon separates in the form of small dark brown needles, is filtered off, washed first with nitrobenene and then with alcohol and is dried. The dyestuff is thus obtained in good yield and purity.

Example 3

In Example 1 an equivalent amount of $\alpha\beta$-bis-(4:4' - dichloro - 9:9' - anthronylidene)-ethane is used in place of the 40 parts of the unsubstituted intermediate and the dichloro derivative of the dyestuff is obtained in good yield.

We claim:

1. In the process for the manufacture of vat dyes wherein αβ-bis-(9:9'-anthronylidene)-ethane is reacted in a solvent of the class consisting of nitrobenzene and nitrotoluene with a compound of the class consisting of carboxylic acid chlorides and carboxylic acid anhydrides which are not inner anhydrides, the step which comprises carrying out the reaction in the presence of an acid of the group consisting of sulfuric acid and sulphamic acid.

2. In the process for the manufacture of vat dyes where αβ-bis-(9:9'-anthronylidene)-ethane is reacted in a solvent of the class consisting of nitrobenzene and nitrotoluene with a compound of the class consisting of carboxylic acid chlorides and carboxylic acid anhydrides which are not inner anhydrides, the step which comprises carrying out the reaction in the presence of sulfuric acid.

3. The process for manufacturing a vat dye, which comprises reacting αβ-bis-(9:9'-anthronylidene)-ethane in nitrobenzene with acetic anhydride, the reaction being carried out with the addition thereto of 98% sulfuric acid.

JOHN WOOLLEY BATTY.
DAVID A. W. FAIRWEATHER.